United States Patent [19]

Ogasawara

[11] 4,409,625
[45] Oct. 11, 1983

[54] METHOD AND APPARATUS FOR INFORMATION READING IN ORIGINAL DOCUMENT READERS

[75] Inventor: Satoru Ogasawara, Ebina, Japan
[73] Assignee: Fuji Xerox Co., Ltd., Tokyo, Japan
[21] Appl. No.: 337,892
[22] Filed: Jan. 7, 1982
[30] Foreign Application Priority Data

Jan. 7, 1981 [JP] Japan .................................. 56-972

[51] Int. Cl.³ .............................................. H04N 1/17
[52] U.S. Cl. ................................................. 358/288
[58] Field of Search ........................ 358/282, 284, 288

[56] References Cited
U.S. PATENT DOCUMENTS 3,902,009 8/1975 Perreault ............................ 358/288

*Primary Examiner*—Howard Britton
*Attorney, Agent, or Firm*—Sughrue, Mion, Zinn, Macpeak & Seas

[57] ABSTRACT

When the lines of information from an original do not coincide with the image sensors, image from one line can be logically combined to provide a signal representing the presence or absence of image on that line.

10 Claims, 5 Drawing Figures

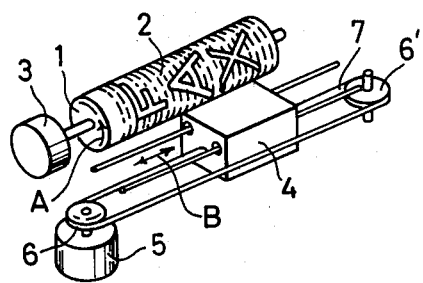
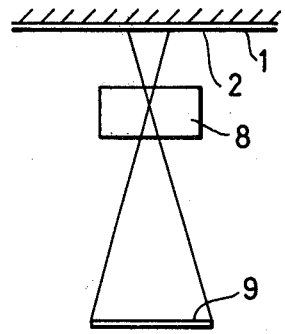
FIG. 1
FIG. 2
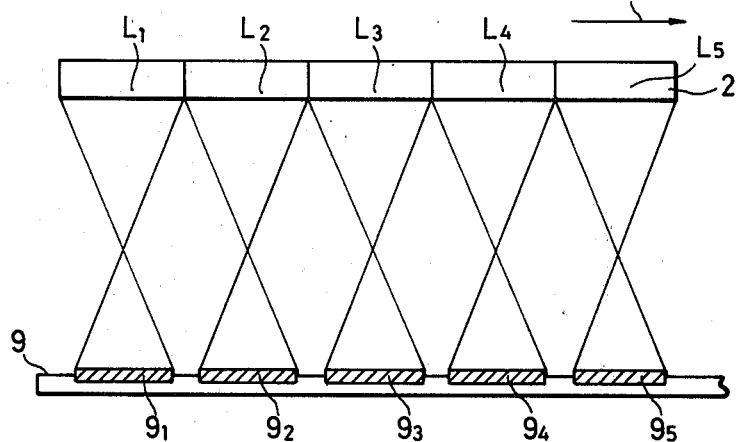
FIG. 3
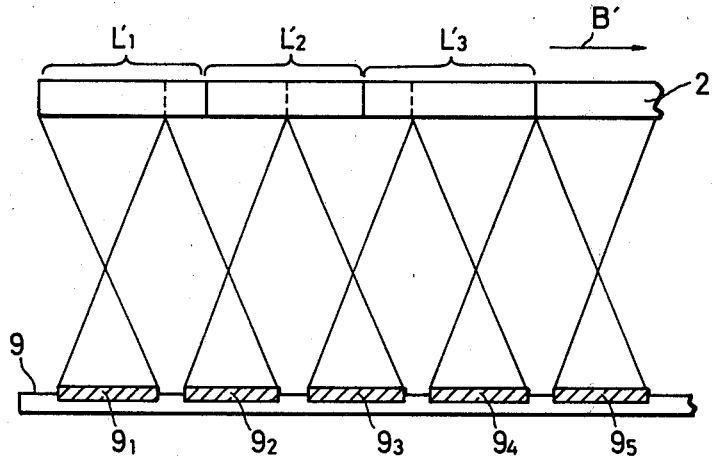
FIG. 4

METHOD AND APPARATUS FOR INFORMATION READING IN ORIGINAL DOCUMENT READERS

BACKGROUND OF THE INVENTION

The present invention relates to an information reading method in an original document reader having a white line skip function.

In original document readers in facsimile systems, it is known to provide a white line skip function which operates, prior to a subscanning of a line to be transmitted, to detect the existence of black information on the line to thereby skip any line having no black information. In conventional white line skip type orginal document readers, the distance between sub-scanning lines is always the same, and therefore the conventional ordinary readers are not applicable to documents having a distance between lines to be scanned which is different from the distance between the scanning lines of the reader. Further, if a conventional reader is designed to have this flexibility, its construction would be complicated and it would not be economical.

SUMMARY OF THE INVENTION

Accordingly, an object of the present invention is to provide an information reading method capable of reading information in a variety of modes in which distances between sub-scanning lines are different from each other, with the use of a simple original document reader including only one sensor and a stationary optical system.

In order to accomplish the foregoing object of the present invention, an information reading method in accordance with the invention employs a first reading sensor element for reading information on a first line of an original document to be transmitted, a group of second reading sensor elements including at least one other reading sensor element for reading information on a second line to recognize the existence of black information thereon prior to transmission of the information on said second line and at the same time as the reading operation of the first reading sensor element, and a stationary optical system, the first reading sensor element, the group of second reading sensor elements and the stationary optical system being included in a multiline concurrent scanning type original document reader having a white line skip function. A significant feature of the present method resides in that the reading operation of the information on the line of the original document to be transmitted is carried out with the first reading sensor element aligned with the line to be transmitted whereas the simultaneous reading operation of the information on another line thereof can be carried out with other reading sensor elements aligned or non-aligned with other lines. Accordingly, the foregoing object is met by the significant feature of the present invention. That is, even if an original document has a variety of modes in which the scanning line distances are different from each other, line information of the original document can be read by a reader provided with a group of sensors having a stationary lens system. As a result, simplification of the reader and reduction of a manufacturing cost become possible.

BRIEF DESCRIPTION OF THE DRAWINGS

Hereinafter, a preferred embodiment of the present invention will be described with reference to the accompanying drawings, in which:

FIG. 1 is a schematic perspective view illustrating a scanning head section of reader;

FIG. 2 is a schematic diagram illustrating an optical system;

FIG. 3 is an explanatory diagram for describing a reading method according to the invention wherein sensor elements are aligned with image lines;

FIG. 4 is a diagram similar to FIG. 3 for the case where the alignment of sensor elements is different from that shown in FIG. 3.

DETAILED DESCRIPTION OF THE INVENTION

Figure 5:
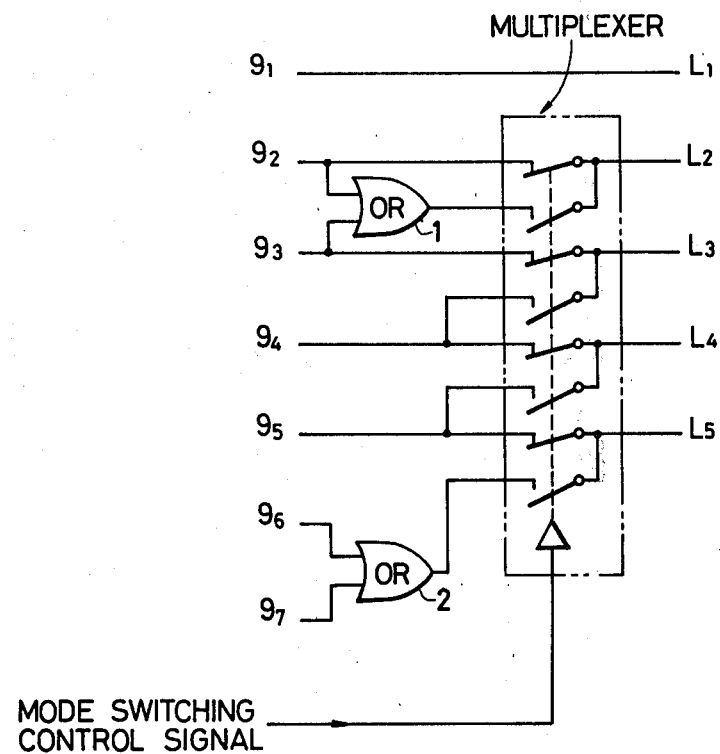
FIG. 5 is a brief diagram of one example of logic and switching circuitry which may be employed in the invention.

FIG. 1 is a perspective view illustrating a scanning head section of an original document reader for use in a facsimile system. In FIG. 1, a drum 1 carries an original document 2 thereon, and the drum is driven by a primary scanning motor 3 to be allowed to rotate in a direction indicated by an arrow A shown in FIG. 1, so that a primary scanning operation is carried out. A scanning head 4 is arranged in such a manner that it faces the original document 2. The scanning head 4 is coupled to a conveying belt 7 which is passed over a pulley 6 rotated by a sub-scanning pulse motor 5 and another pulley 6'. Accordingly, the scanning head 4 moves in a direction indicated by an arrow B in accordance with the rotation direction of the pulse motor 5, so that a sub-scanning operation is carried out. FIG. 2 is a diagram showing an optical arrangement of a sensor of the scanning head 4 and the original document 2. More specifically, an image of the original document 2 is projected onto a sensor 9 through a stationary optical system 8 (a lens system).

FIG. 3 shows a sub-scanning operation in a direction indicated by an arrow B' for scanning a plurality of lines simultaneously with one sensor 9. In this case, information on a line $L_1$ which is read by an element $9_1$ of the sensor 9, is transmitted to a receiving station. On the other hand, information that are read by elements $9_2$ to $9_5$ are used to recognize whether or not black information exists on lines $L_2$ through $L_5$. In case of no black information on the lines $L_2$ through $L_5$, due to the white line skip function, the scanning operation for lines having no black information is skipped. In the example shown in FIG. 3, an image from each line is serially formed on one corresponding sensor element (referred to merely as a mode A when applicable). In other words, the presence or absence of data on each line is determined in accordance with the output from a single element.

Assuming that the same type sensor 9 and optical system (lens system 8) are employed for a document wherein the distances between the scanning lines are different from FIG. 3, an image from each line is not coincident with the corresponding sensor element (referred to merely as a mode B when applicable). This mode B condition is shown in FIG. 4. In accordance with one embodiment of the present invention, in case of mode B operation, the first sensor element $9_1$ of the sensor 9 is made coincident with a line $L_1'$ carrying information to be transmitted thereon. If the scanning and reading operation is carried out under this condition, the content of the first line $L_1'$ can be substantially accurately read by only the first sensor element $9_1$. In this case, however, the following lines may not coincide with respective remaining sensor elements. Therefore, according to a preferred embodiment of the present invention as shown in FIG. 4, information that is raed by the sensor elements $9_2$ and $9_3$ is used together as information with respect to the line $L_2'$. This information is subjected to a logic summation to thereby process the information as an information for one line. Subsequently, the thus obtained information is subjected to detection to recognize whether or not the information includes black information. Further, an information that is read by the sensor element $9_4$ is used to detect whether black information is contained in the third line $L_3'$. Consequently, while performing the sub-scanning operation with the first scanning element 9, along a line $L_1'$ carrying an information to be transmitted, since the information on the lines other than the first line is read by either a single corresponding sensor element or by a combination of sensor elements, the necessary information can be obtained with respect to each of the remaining lines. This results in satisfactory performance of the conventional white line detection.

One example of a suitable arrangement for switching between modes A and B is briefly shown in FIG. 5. In the mode A, the multiplexer may respond to a mode A control signal to select the sensor elements directly as indications of the presence or absence of information on a respective line. For mode B, the multiplexer then selects the output of gate $OR_1$ as information for line $L_2'$, the output of element $9_4$ for line $L_3'$, the output of element $9_5$ for line $L_4'$, the output of gate $OR_2$ for line $L_5'$, etc.

Thus, the device according to the present invention can easily switch back and forth between the different modes. It should be apparent that the two-mode arrangement is given by way of an illustrating example only, and that the invention is clearly applicable to devices having more than two modes of operation, or to devices having two different modes than those described above. Further, even in the same modes as shown, a different logic and/or switching arrangement could be used if desired.

In the present invention, it is preferable to employ a sensor in which a plurality of sensor elements are arranged in such a manner that they are aligned with respective sub-scanning lines, with the distance between the sub-scanning lines being either a minimum value or a value which is most frequently used. However, the present invention is not intended to be limited to the above described preferred embodiment. More specifically, in an extreme case, the sensor elements may be aligned with scanning lines whose distance is either some maximum value or a value which is not frequently used. Furthermore, while only the first sensor element is aligned with one line carrying an information to be transmitted thereon in the above described embodiment, the sensor elements may be spaced by an amount equal to distance between the respective scanning lines. Moreover, it goes without saying that the present invention could also be used in a white space skip function in a primary scanning direction i.e. for the skipping of white spaces between characters on any given lines.

According to the present invention, with one simple reader including a group of sensor elements and a stationary optical system, scanning and reading operations for a variety of modes in which scanning line distances are different from each other are possible. Hence, the information reading method of the present invention does not require a reader high in manufacturing cost and complicated in construction.

What is claimed is:

1. An information reading device comprising a sensor having a plurality of sensing elements receiving an image of an original document through an optical system, said original document having respective lines of information thereon separated by first intervals, said sensing elements not aligned with said lines of information separated by said first intervals such that the lines of information in the image received by said sensing elements are not aligned with said sensing elements, and logic means for combining selected sensor element outputs to obtain signals representing information on respective lines.

2. A reading device as claimed in claim 1, wherein said logic means is switchable to provide at least first and second different sets of output signals in response to said sensor element output signals, said first and second sets of output signals corresponding to different original documents having first and second different information line intervals.

3. A reading device as claimed in claim 2, wherein in a first mode said logic means provides said sensor outputs directly as indications of information contained within respective lines, and in a second mode said logic means selects at least a portion of its output signal set from a logical combination of sensor element outputs.

4. A reading device as claimed in claim 3, wherein said at least portion of said output signal set includes at least one logical OR combination of outputs from at least two sensor elements overlapped by the image from a single information line.

5. A reading device as claimed in claim 2, wherein one of said sensor elements always represents information from a line containing information to be transmitted and the remaining sensor elements detect the presence or absence of information on subsequent lines while the information of said first line is being read by said one sensor element.

6. A method of reading information in a multiline concurrent scanning type original document reader, said reader having a plurality of sensors for receiving through an optical system an image of information from said original document, said original having a plurality of lines of information thereon, said method comprising:
    forming an image of said original on said sensing elements such that at least one of the lines of information in said image overlaps at least a first and a second of said sensor elements; and
    logically combining outputs from said first and second sensor elements to obtain a signal representing the information of said at least one line.

7. A method as claimed in claim 6, wherein said step of logically combining comprises providing a first combination of said sensor output signals indicating respective lines of image information for an original having a first interval between lines and a second combination of signals representing image information for an original having a second interval between lines.

8. A method as claimed in claim 7, wherein said step of providing said first combination of said sensor output signals comprises providing said sensor output signals directly as indications of information on respective lines and wherein said step of providing said second combination of output signals comprises providing a logical OR combination of at least said first and second sensor element outputs.

9. A method as claimed in claim 6, wherein one of said sensor elements reads information from a line being transmitted and the remaining sensor elements detect the presence or absence of information on subsequent lines.

10. A method as claimed in claim 9, further comprising the step of advancing said original such that said line to be transmitted is always in substantial registration with said one sensor element.

* * * * *